(12) United States Patent
Briggs et al.

(10) Patent No.: US 11,679,424 B1
(45) Date of Patent: Jun. 20, 2023

(54) DISPOSAL OF BIOMASS WASTE

(71) Applicant: B B & M Materials, LLC, Casper, WY (US)

(72) Inventors: David L. Briggs, Newburgh, IN (US); Mark Thomas Mersman, Boulder, CO (US); Dawn Boyter, Doyline, LA (US)

(73) Assignee: B B & M Materials, LLC, Casper, WY (US)

( * ) Notice: Subject to any disclaimer, the term of this patent is extended or adjusted under 35 U.S.C. 154(b) by 0 days.

(21) Appl. No.: 18/145,151

(22) Filed: Dec. 22, 2022

Related U.S. Application Data

(60) Provisional application No. 63/293,919, filed on Dec. 27, 2021.

(51) Int. Cl.
| | |
|---|---|
| *B09B 1/00* | (2006.01) |
| *E21B 41/00* | (2006.01) |
| *B65G 5/00* | (2006.01) |
| *E21F 17/16* | (2006.01) |
| *E21B 29/06* | (2006.01) |

(52) U.S. Cl.
CPC .............. *B09B 1/008* (2013.01); *B65G 5/00* (2013.01); *E21B 29/06* (2013.01); *E21B 41/005* (2013.01); *E21F 17/16* (2013.01); *Y02C 20/00* (2013.01)

(58) Field of Classification Search
CPC .......... B09B 1/008; B65G 5/00; E21B 29/06; E21B 41/005; E21F 17/16; Y02C 20/00
See application file for complete search history.

(56) References Cited

U.S. PATENT DOCUMENTS

| | | | | | |
|---|---|---|---|---|---|
| 3,459,003 | A | * | 8/1969 | O'Neal ................... | E21F 17/00 299/11 |
| 3,665,716 | A | * | 5/1972 | Rogers ..................... | B09B 1/00 405/129.35 |
| 4,192,555 | A | * | 3/1980 | Willett .................... | E21B 43/28 299/4 |
| 4,666,346 | A | * | 5/1987 | MacLeod ............... | E21F 15/00 285/283 |
| 5,004,298 | A | * | 4/1991 | Boulanger ............. | B09B 1/008 299/5 |

(Continued)

FOREIGN PATENT DOCUMENTS

| | | |
|---|---|---|
| CN | 112441797 A | 3/2021 |
| WO | WO-2008079029 A2 * 7/2008 | ............. C10B 19/00 |

OTHER PUBLICATIONS

Rodriguez-Franco, Carlos; Page-Dumroese, Deborah S., "Woody Biochar Potential for Abandoned Mine Land Restoration in the U.S.: a Review," Biochar, vol. 3, Jan. 14, 2021, pp. 7-22.

*Primary Examiner* — Janine M Kreck
(74) *Attorney, Agent, or Firm* — Luedeka Neely Group, PC

(57) ABSTRACT

A method for disposing of biomass waste. The method includes locating an abandoned mine having a first well drilled into or through the abandoned mine. Water is removed from a mine cavity through a second well drilled into or through the abandoned mine. The water from the mine is combined with a biomass waste that is at least 70 wt. % carbon to provide biomass waste entrained in the water. The biomass waste entrained in the water is pumped through the first well into the mine cavity to fill the mine cavity. As the biomass waste settles in the mine cavity, the water used to entrain the biomass waste is recirculated to combine with additional biomass waste.

20 Claims, 5 Drawing Sheets

(56) References Cited

U.S. PATENT DOCUMENTS

| | | | | |
|---|---|---|---|---|
| 5,423,387 A | * | 6/1995 | Lynde | E21B 7/061 |
| | | | | 166/117.5 |
| 5,431,219 A | * | 7/1995 | Leising | E21B 23/00 |
| | | | | 166/50 |
| 8,308,911 B2 | | 11/2012 | Cheiky | |
| 9,546,315 B2 | | 1/2017 | Pollard et al. | |
| 10,557,338 B2 | | 2/2020 | Rhodes et al. | |
| 11,104,611 B2 | | 8/2021 | Ofori-Boadu et al. | |
| 2007/0228804 A1 | * | 10/2007 | Crayne | E21F 15/10 |
| | | | | 299/12 |
| 2009/0252881 A1 | * | 10/2009 | Kobayashi | B05B 7/0416 |
| | | | | 239/398 |
| 2021/0355791 A1 | | 11/2021 | Meehan et al. | |
| 2022/0234955 A1 | | 7/2022 | Masotti | |

* cited by examiner

DISPOSAL OF BIOMASS WASTE

TECHNICAL FIELD

The disclosure is directed to methods for disposing of biomass waste, in particular methods to fill abandoned mines with biomass waste to provide a source of carbon credits to industry.

BACKGROUND AND SUMMARY

There are a large number of abandoned underground coal mines and abandoned coal mines that have oil wells penetrated into or through those mines. Many, if not most, of the oil wells are abandoned and need to be plugged. For example, there are 14,000 wells on the orphan well list in Kentucky that are being entered into a plugging program funded by the Federal government. There is also a growing need to find suitable disposal processes for biomass waste generated from grass, municipal waste, manure, sawmills, and the like. Many of the current disposal programs for biomass waste increase carbon emissions or provide very low carbon credits. Accordingly, there is a need for a more environmentally suitable method for disposing of biomass waste without increasing carbon emissions while at the same time providing a source for premium carbon credits for carbon emitting industries.

According to an embodiment of the disclosure, there is provided a method for disposing of biomass waste. The method includes locating an abandoned mine having a first well drilled into or through the abandoned mine. Water is removed from a mine cavity through a second well drilled into or through the abandoned mine. The water from the mine is combined with a biomass waste that is at least 70 wt. % carbon to provide biomass waste entrained in the water. The biomass waste entrained in the water is pumped through the first well into the mine cavity to fill the mine cavity. As the biomass waste settles in the mine cavity, the water used to entrain the biomass waste is recirculated to combine with additional biomass waste.

In some embodiments, the first well is plugged below a floor level of the abandoned mine.

In some embodiments, a directional deviation tool is used to open a first window in a first well casing and first well casing cement into the mine cavity. In other embodiments, directional deviation tool is used to open a first window in a first well casing, first well casing cement, and a coal pillar adjacent to the first well into the mine cavity.

In some embodiment the directional deviation tool is used to open one or more additional windows in the first well casing and first well casing to fill the mine cavity surrounding the first well with the biomass waste. In other embodiments, the directional deviation tool is used open one or more additional windows in the first well casing, first well casing cement, and coal pillar adjacent to the first well to fill the mine cavity surrounding the first well with the biomass waste. In some embodiments, the directional deviation tool is a whipstock.

In some embodiments, the step of pumping biomass waste entrained in water through the first well into the mine cavity further includes pumping the biomass waste entrained in the water through a flexible tubing into the mine. In other embodiments, the flexible tubing is extended to a distance of at least about 30 meters into the mine cavity and the flexible tubing is withdrawn through the first well as the mine cavity fills with biomass waste.

In some embodiments, the flexible tubing has a swivel nozzle at a distal end of the flexible tubing to broadcast the biomass waste into the mine cavity.

In some embodiments, the step of pumping biomass waste entrained in water through the first well into the mine cavity includes pumping the biomass waste entrained in the water through a lightweight polymeric tubing having an inflatable flotation device on a distal end thereof and inflating the flotation device to suspend a distal end of the lightweight polymeric tubing in the mine cavity.

According to embodiments of the disclosure, the biomass waste can be used as a carbon sink in abandoned mines to provide a source for premium carbon credits. Since the abandoned mines are usually filled with water, the water can be used as a source to entrain the biomass waste to fill the mine cavity without the use of a fresh water source. An advantage of the disclosed embodiments is that thousands of abandoned wells drilled into and/or through abandoned mines can be used along with the mine water in the abandoned mines to provide an environmental stable disposal site for biomass waste.

DETAILED DESCRIPTION

Figure 1:
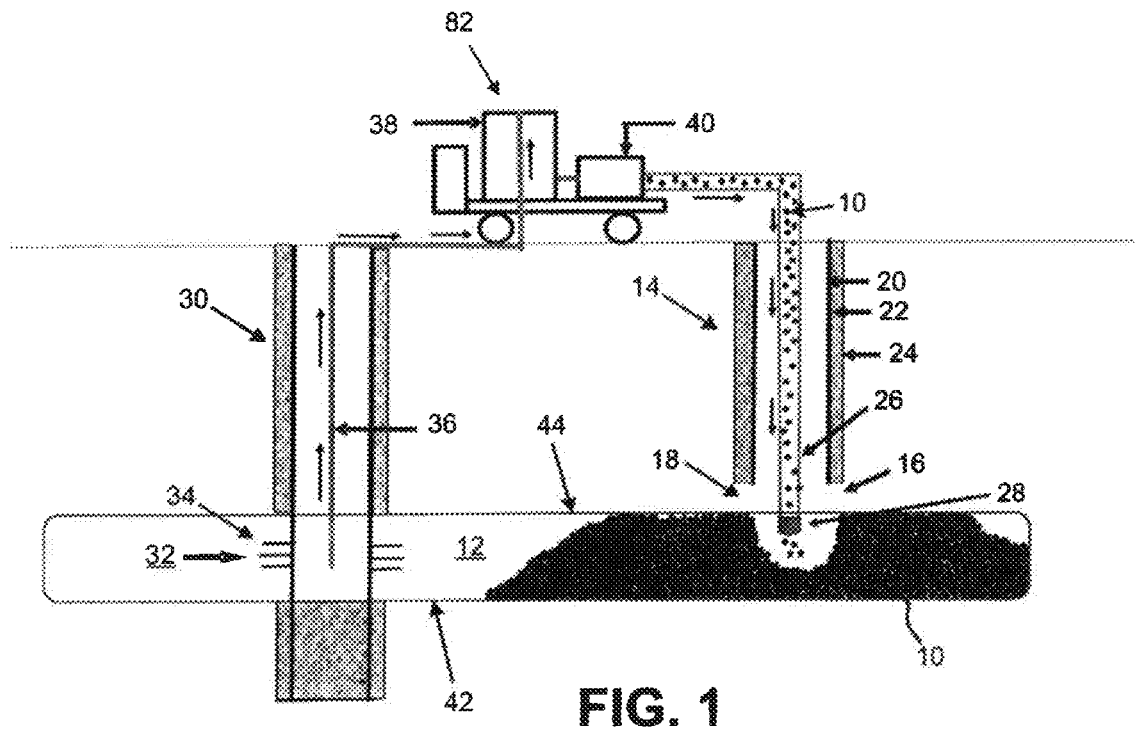
FIG. 1 is a schematic drawing of a first process for filling an abandoned mine with biomass waste.

For the purposes of the disclosure, "biomass waste" is or includes an organic material that is derived from living organisms such as plants or animals. Biomass waste can be or include, for example, agricultural waste (e.g., corn stover), forestry residue (e.g., branches, leaves, etc.), woody biomass (e.g., trees, shrubs, bushes, etc.), non-woody biomass (e.g., sugar cane, cereal straw, seaweed, algae, cotton, grass, kelp, soil, etc.), and/or processed waste (e.g., cereal husks and cobs, bagasse, nut shells, plant oil cake, sawmill waste, food waste, human waste, animal waste, animal fats, etc.).

In various examples, a "carbon-containing material" can be or include a solid, liquid, or gas having one or more carbon atoms. Some carbon-containing materials can be referred to herein as being "biogenic." Such biogenic carbon-containing materials can be produced directly by living organisms (e.g., biomass such as wood, grass, or animal fat) or can be derived from materials produced by the living organisms (e.g., biochar, biocrude, glycerol, or gasoline), as described herein.

The biomass waste can be converted into biochar by feeding the biomass waste into any type of pyrolyzing system ranging from a flash pyrolyzer, which operates on a sub-second basis to roasting techniques that require several hours. The pyrolysis process can be oxygen or air fed and, thus, rely on partial oxidation for heating, or it can be indirectly heated and operate in inert or reducing atmospheres to minimize partial oxidation products. The pyrolyzer can operate in a vacuum, at atmospheric pressure, or at high pressure. It can operate with a gaseous, liquid, or supercritical fluid working medium. In most cases, the carbon output from such pyrolysis operations includes two or more components, typically including the following: (A) biochar which is small aggregates of carbon which partially retain some of the cellular structure of the original biomaterial and (B) micro to nanoscale filtrate carbon from the pyrolyzer's gas or liquid working. Ideally, for the purposes of this disclosure the biomass waste, such as biochar, should be in the form of pellets having a density of about 0.56 grams per $cm^3$ and have a low moisture content such as a moisture content of less than 15 wt. %, for example 10 wt. % or less. It is preferred that the biomass waste have a high carbon content, such as a carbon content of 70 or 80 wt. % based on a total weight of the biomass waste material.

According to embodiments of the disclosure, the biomass waste will be deposited in an abandoned mine cavity using recycled mine water to carry the biomass waste into the mine. In some embodiments, the disclosed process of depositing biomass waste into a mine includes the use of an abandoned well that was drilled for oil or gas through an open mine, however, oil wells may also have been drilled through a coal pillar in an abandoned coal mine. The coal pillar is where coal is not mined to support the roof of the coal mine or in the case a where an oil well already exists prior to mining activity. If the oil well exists prior to mining activity, the mining company cannot excavate within a certain distance, such as about 45 meters, from the oil well. Regardless of whether an oil well was drilled through on open mine or through a coal pillar, the well casing, casing cement, and coal pillar, where present, to open one or more windows to extend a flexible pipe out into the open mine to deposit the biomass waste therein.

In some embodiments, the abandoned coal mine does not have any wells drilled in or through the mine. In that case, new wells will be drilled into the mine to deposit the biomass waste therein and to remove mine water for entraining the biomass waste as described in more detail below.

In some embodiments, other abandoned wells are called coal bed methane (CBM) wells were drilled for the purpose of extracting gas from a coal mine may be used. The abandoned wells were drilled to the top of the coal mine, therefore, the well did extend down into or through the mine but stopped at the ceiling level of the abandoned mine. In both cases, a directional deviation tool, such as a retrievable whipstock may be used in the abandoned wells to open one or more windows into the abandoned mine in directions that will maximize the ability to fill the abandoned mine with the biomass waste material.

In the case of an abandoned first well drilled through an abandoned coal mine, the abandoned first well will be plugged back to the floor of the abandoned mine. One or more large windows will be cut in the side of the first well casing, casing cement, and/or coal pillar at the top of the mine using directional deviation tool, such as a whipstock in order to slide a flexible tubing into the abandoned mine cavity in a direction that is at an angle ranging from about 10 to about 90 degrees from the direction of the first well casing in order to fill the mine cavity with the biomass waste material. The windows cut in the well casing, casing cement, and/or coal pillar may have a diameter of 7 cm or larger. Several windows may be cut through the well casing, casing cement, and/or coal pillar in different directions in order to fill the mine cavity surround the well.

A second well, if present or, if not present, will be drilled into the mine cavity to withdraw mine water from the mine cavity to use to suspend or entrain the biomass waste therein for pumping into the mine cavity from the first well. As the biomass waste is pumped into the mine cavity, the flexible tubing will be withdrawn from the first well by sliding the flexible tubing out of the mine cavity and well as the until the mine cavity is filled. The flexible tubing may be extended into the mine cavity horizontally for about 30 meters or more in order to fill the mine cavity. In some embodiments, an inflatable float will be attached to the distal end of the flexible tubing in order to suspend the distal end of the tubing in the water present in the mine cavity. As the biomass waste is pumped into the mine cavity using the flexible tubing, the biomass waste will settle out on the mine cavity floor and the mine water will be recovered through the second well and used to suspend or entrain additional biomass waste for filling the mine cavity. A swivel nozzle may also be used on the distal end of the flexible tubing in order to broadcast the biomass waste into the mine cavity.

The tubing used to deposit the biomass waste in the mine may be rigid metal or plastic tubing, flexible plastic tubing, or coiled metal tubing. The type of tubing used will depend on the configuration of the wells and the method used to deposit biomass waste in the mine. Several methods are described herein.

The attached FIGS. 1-9 are attached to illustrate various aspects of the disclosed embodiments. FIG. 1 illustrates a first method for depositing biomass waste 10 into an abandoned mine cavity 12 using an existing well 14 that extends into the mine cavity 12. In FIG. 1, the mine is a coal bed methane (CBM) mine. According to the method, a directional deviation tool, such as a whipstock is used to open one or more windows 16 and 18 through the well casing 20, the casing cement 22, and the borehole 24. Next a pipe or tubing 26, which can be flexible or rigid, is used to pump biomass waste suspended in water into the mine cavity 12. The end of the pipe or tubing 26 may contain a swivel nozzle 28 to broadcast the biomass waste 10 into the cavity 12. A second well 30 is used to withdraw mine water 32 from the abandoned mine cavity 12 through perforations 34 in the well 30 through a pipe or tubing 36 to a water and biomass waste blending tank 38 and then to a high-volume pump 40. Since the biomass waste 10 has a specific gravity greater than water, the biomass waste 10 will settle out on the floor 42 of the abandoned mine as shown to fill the mine cavity 12 up to a ceiling level 44 of the mine. The flexible pipe or tubing 26 can be withdrawn through the well 14 as the mine cavity 12 fills with the biomass waste 10. As shown, the pipe or tubing 26 is initially inserted into the mine cavity 12 below the ceiling level 44 of the mine cavity 12.

Figure 2:
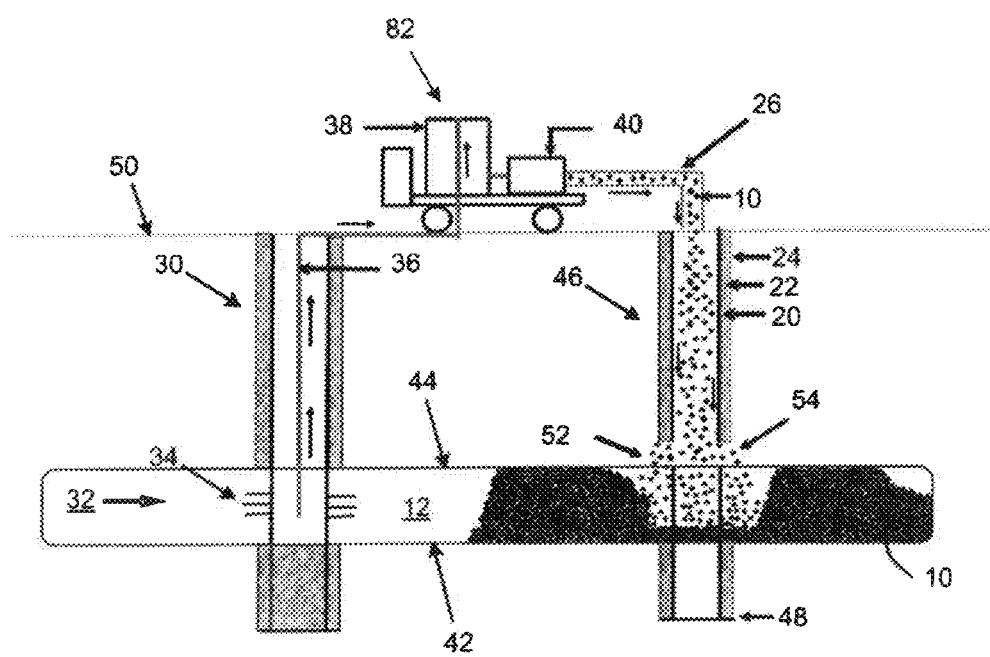
FIG. 2 is a schematic drawing of a second process for filling an abandoned coal mine with biomass waste.

In FIG. 2, the well 46, which may be an oil or gas well, is originally drilled through the abandoned mine cavity 12 to a total depth of 48. After partially filling the abandoned mine cavity 12 according to the process described in FIG. 1, the pipe or tubing 26 may be removed or cut back to the surface 50, as shown, and the biomass wasted 10 pumped through the well 46 to continue filling the mine cavity 12 through windows 52 and 54 in the well 46.

Figure 3:
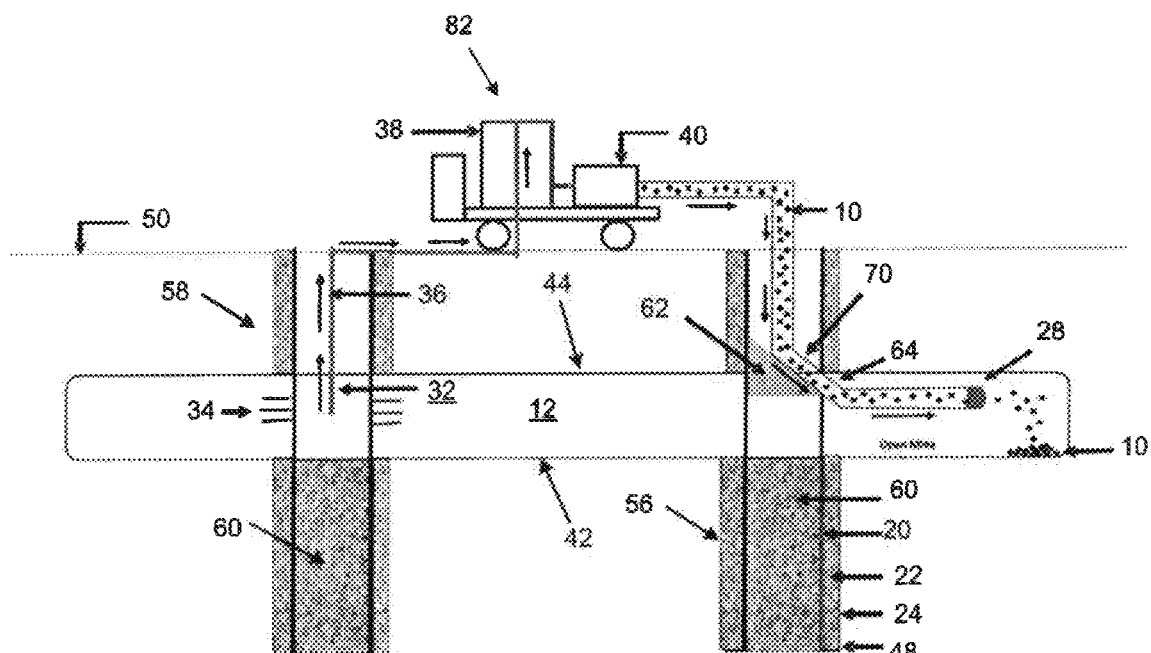
FIG. 3 is a schematic drawing of a third process for filling an abandoned mine with biomass waste.

Another embodiment of the method to fill an abandoned mine cavity 12 with biomass waste is illustrated in FIG. 3 wherein one or more wells 56 and 58 have been drilled through the abandoned mine cavity 12 to a total depth 48.

The wells may then be plugged with cement or other plugging materials 60 back up to the mine floor 42.

Figure 4:
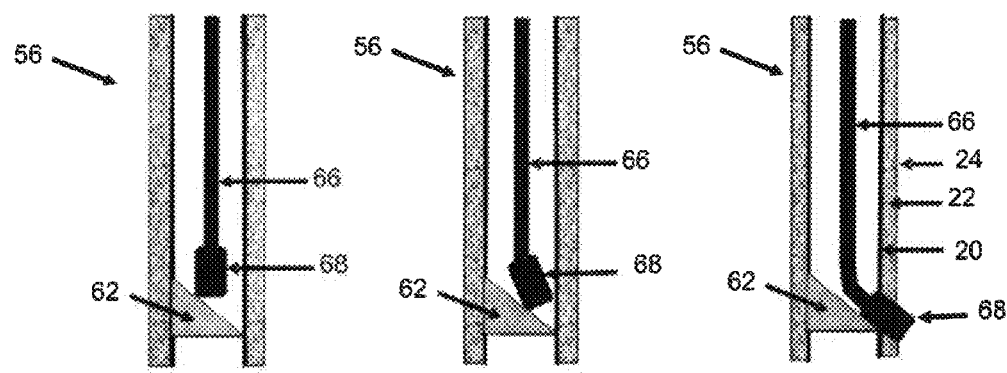
FIG. 4 is a schematic drawing of a process for opening windows in an abandoned well for use with the process of FIG. 3.
Figure 5:
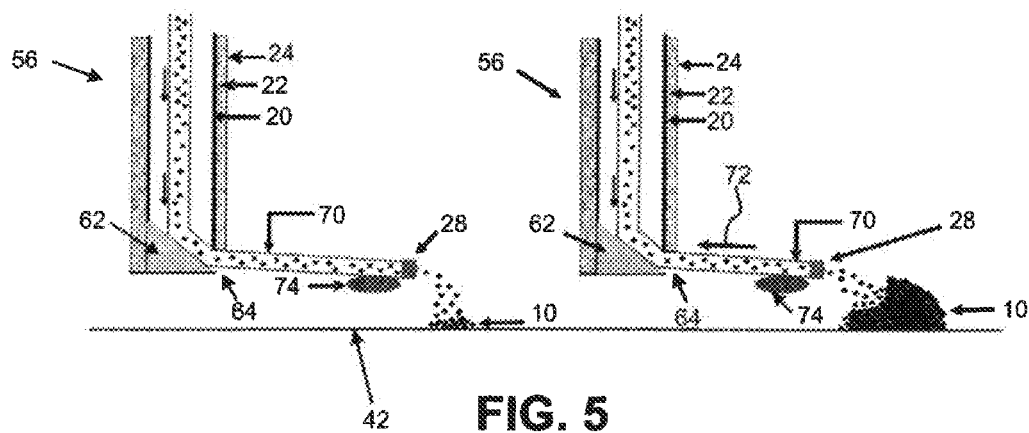
FIG. 5 is a schematic drawing of an alternative method for filling a mine cavity with biomass waste.

According to FIG. 3, a removable whipstock 62 may be used to open one or more windows 64 into the mine cavity 12. FIG. 4 illustrates how the whipstock 62 may be used to open windows in the well 56. A drill pipe 66 containing a mining tool 68 may be inserted into the well 56 and is caused by the whipstock 62 to bore through the well casing 20, casing cement 22 and borehole 24 to open one or more windows in the well 56. The whipstock 62 may then be used with flexible piping or tubing 70 to deposit the biomass waste 10 in the mine cavity 12 as illustrated in more detail in FIG. 5. As above, a swivel nozzle 28 may be used to broadcast the biomass waste 10 into the mine cavity 12. The flexible pipe or tubing 70 may be extended into the mine cavity 12 at an angle ranging from about 10 to about 90 degrees orthogonal to an axis of the well 56 in order to fill the mine cavity 12. As the mine cavity is filled, the flexible pipe or tubing 70 may be withdrawn in the direction of arrow 72 through the well 56 as illustrated in FIG. 5 moving from left to right. The swivel nozzle 28 is used to broadcast the biomass waste 10 into the mine cavity 12 to fill the mine from the floor 42 up to the ceiling level 44.

In some embodiments, a lightweight flexible tubing 70 may be used to deposit the biomass waste in the mine cavity 12. In this case, an inflatable bladder or float 74 may be attached to the flexible tubing 70 and inflated once the tubing 70 is in the mine. Since the mine is filled with water, the inflatable bladder or float 74 will keep the end of the lightweight flexible tubing 70 floating in order to broadcast the biomass wasted further into the mine. As set forth above, the lightweight flexible tubing 70 may be extended into the mine through the window 64 an initial distance of 30 meters or more and withdrawn through the well 56 as the mine cavity fills with the biomass waste.

Figure 6:
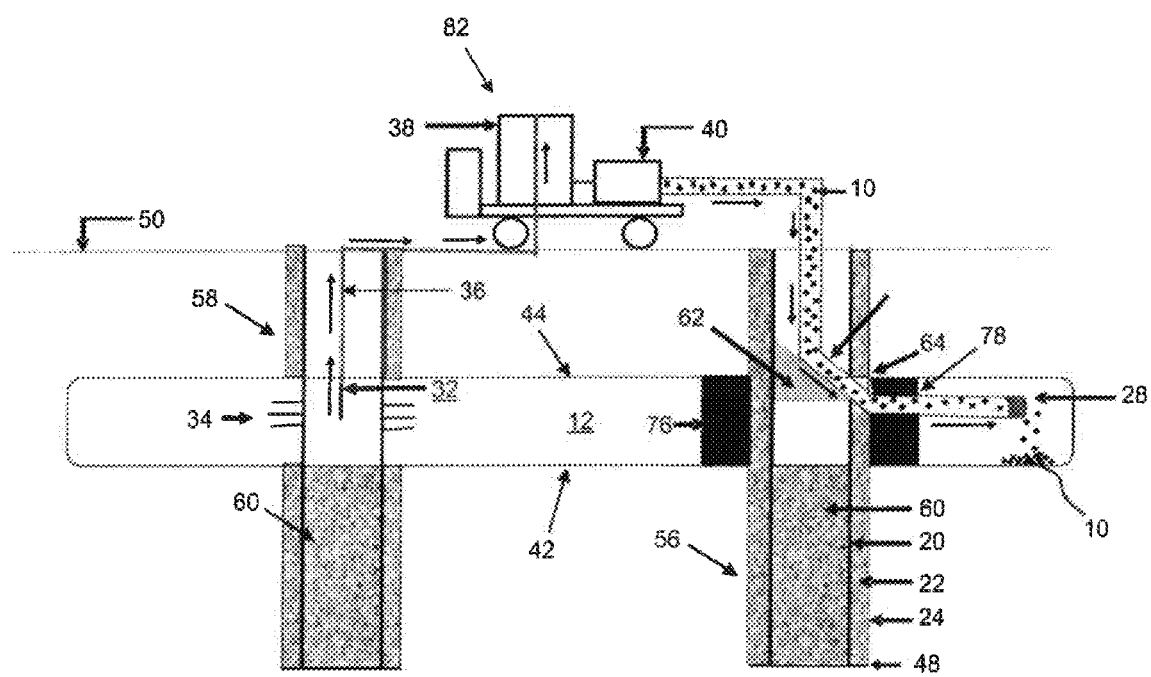
FIG. 6 is a schematic drawing the process of FIG. 3 for filling an abandoned mine with biomass waste in the presence of a coal pillar surrounding the well.

In some embodiments, as shown in FIG. 6, the process described above with reference to FIG. 3 may also be used when the well 56 is drilled through an abandoned coal mine 12 and the well 56 penetrates a coal bed. In that case, coal can only be excavated to within only about 45 meters of the well 56 resulting in a coal pillar 76 remaining adjacent to the well 56. Accordingly, the mining tool 68 described above will also be used to open one or more windows 78 in the coal pillar 76 as shown in FIG. 6. Deposition of the biomass waste 10 may then proceed as described above surrounding the coal pillar 76 in the mine cavity 10 with biomass waste 10 until the mine cavity is filled.

Figure 7:
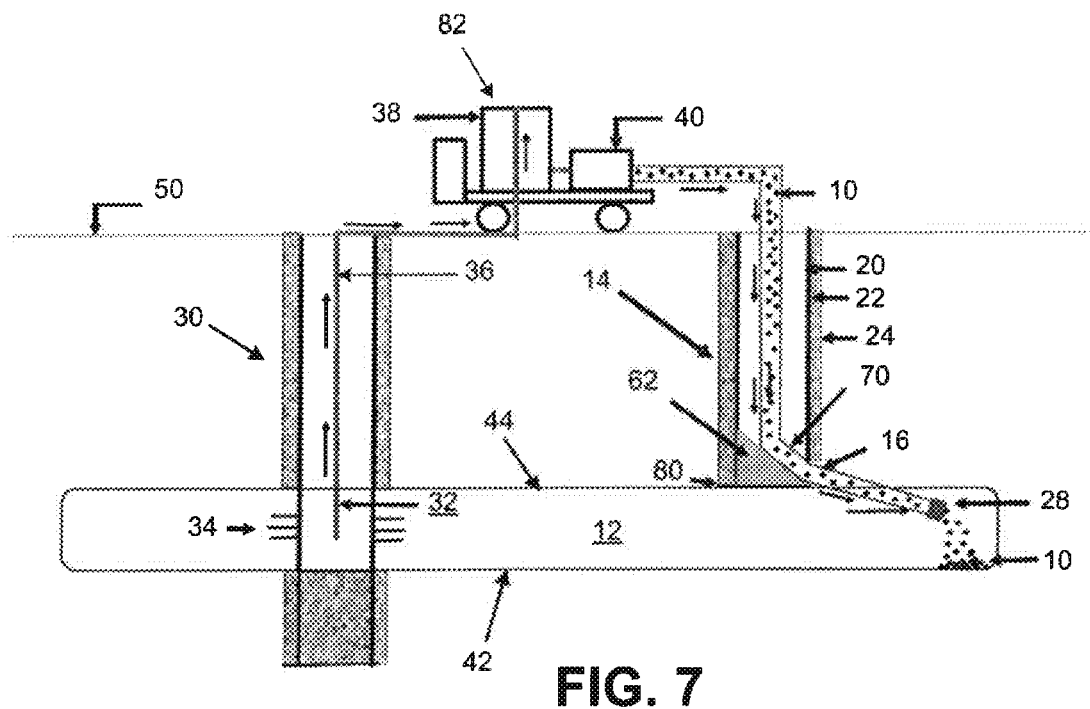
FIGS. 7-8 are schematic drawings of an alternative method for filling the mine of FIG. 1 with biomass waste.
Figure 8:
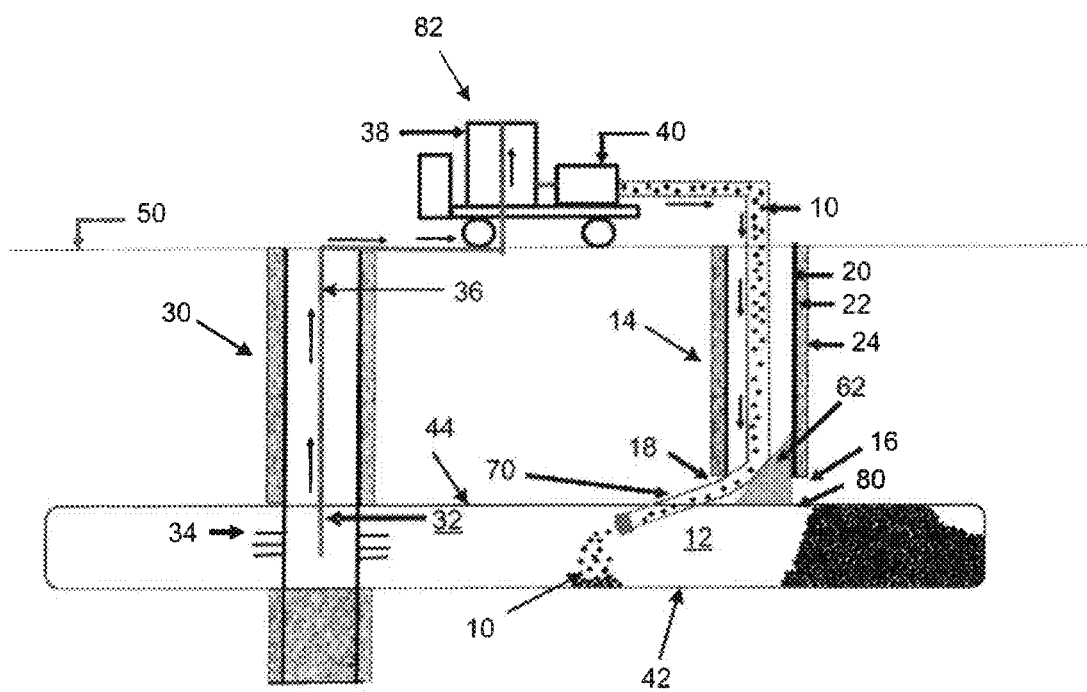

In another embodiment illustrated in FIGS. 7 and 8, the removable whipstock 62 may be used to open windows 16 and 18 in CBM mine as illustrated. In FIG. 7, the well 14 is drilled to a total depth 80 and the window 16 is opened with the removable whipstock 62 as described above. When a portion of the mine cavity 12 is filled through window 16, one or more windows, such as window 18 (FIG. 8) may be opened to fill another portion of the mine cavity 12 and the window 16 is closed by the removable whipstock 62. It will be appreciated that windows can be open in several directions around the periphery of the well 14 in order to completely fill the mine cavity 12 with biomass waste 10.

Figure 9:
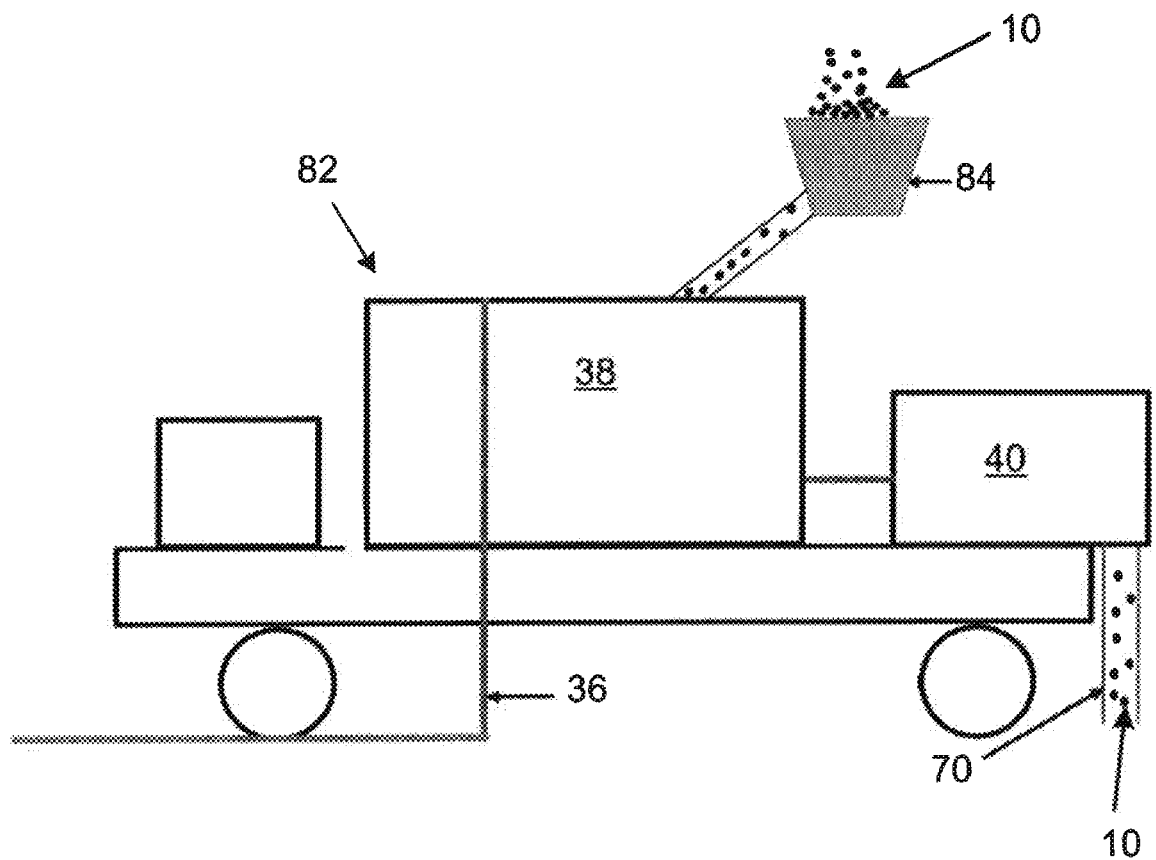
FIG. 9 is a schematic drawing of a vehicle for use in filling an abandoned mine with biomass waste.

In order to mix the mine water 32 and biomass waste 10, a stationary or, preferably, a portable blending tank 38 and high-volume pump 40 may be mounted on a vehicle 82 as shown in FIG. 9 for use at multiple well sites. A hopper 84 or other means may be loaded with biomass waste 10 from bags, supersacks, or bulk truck for loading into the blending tank 38 for mixing with the mine water 32 prior to pumping the mixture into the mine cavity 12, using the high-volume pump 40.

By using the abandoned coal mines and abandoned wells to deposit biomass waste into the mine cavities, up to 2.5 to 3 carbon credits per metric ton of biomass waste may be achieved rather than the typical 1 carbon credit achieved by other biomass waste disposal techniques.

It is noted that, as used in this specification and the appended claims, the singular forms "a," "an," and "the," include plural referents unless expressly and unequivocally limited to one referent. As used herein, the term "includes" and its grammatical variants are intended to be non-limiting, such that recitation of items in a list is not to the exclusion of other like items that can be substituted or added to the listed items For the purposes of this specification and appended claims, unless otherwise indicated, all numbers expressing quantities, percentages or proportions, and other numerical values used in the specification and claims, are to be understood as being modified in all instances by the term "about." Accordingly, unless indicated to the contrary, the numerical parameters set forth in the following specification and attached claims are approximations that can vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

While particular embodiments have been described, alternatives, modifications, variations, improvements, and substantial equivalents that are or can be presently unforeseen can arise to applicants or others skilled in the art. Accordingly, the appended claims as filed and as they can be amended are intended to embrace all such alternatives, modifications variations, improvements, and substantial equivalents.

What is claimed:

1. A method for disposing of biomass waste, comprising,
   locating an abandoned coal mine having a first well drilled into or through a mine cavity of the abandoned coal mine having a roof and a floor level;
   removing acidic water from the mine cavity of the abandoned coal mine through a new or existing second well drilled into or through the abandoned coal mine;
   combining the acidic water from the mine cavity with a biomass waste comprising at least 60 wt. % carbon to provide biomass waste entrained in the acidic water;
   pumping the biomass waste entrained in the acidic water through the first well into the mine cavity to fill the mine cavity with the biomass waste; and
   as the biomass waste settles in the mine cavity, recirculating the acidic water used to entrain the biomass to combine with additional biomass waste.

2. The method of claim 1, wherein the first well is an abandoned well, further comprising plugging at least the first abandoned well below the floor level of the abandoned coal mine.

3. The method of claim 1, further comprising using a directional deviation tool in the first well to open a first window in a first well casing and first well casing cement into the mine cavity.

4. The method of claim 3, further comprising repositioning the directional deviation tool in the first well to open one or more additional windows in the first well casing and first well casing to fill the mine cavity surrounding the first well with the biomass waste.

5. The method of claim 4, wherein the directional deviation tool comprises a whipstock.

6. The method of claim 1, further comprising using a directional deviation tool in the first well to open a first window in a first well casing, first well casing cement, and a coal pillar adjacent to the first well into the mine cavity.

7. The method of claim 6, further comprising repositioning the directional deviation tool in the first well to open one or more additional windows in the first well casing, first well casing cement, and coal pillar adjacent to the first well to fill the mine cavity surrounding the first well with the biomass waste.

8. The method of claim 7, wherein the directional deviation tool comprises a whipstock.

9. The method of claim 1, wherein the step of pumping biomass entrained in the acidic water through the first well into the mine cavity further comprises pumping the biomass waste entrained in the acidic water through a flexible tubing into the abandoned coal mine.

10. The method of claim 9, wherein the flexible tubing comprises a swivel nozzle at a distal end of the flexible tubing to broadcast the biomass waste into the mine cavity.

11. The method of claim 9, further comprising extending the flexible tubing to a distance of at least about 30 meters into the mine cavity and withdrawing the flexible tubing through the first well as the mine cavity fills with biomass waste.

12. The method of claim 1, wherein the step of pumping biomass waste entrained in acidic water through the first well into the mine cavity further comprising:
   pumping the biomass waste entrained in the acidic water through a lightweight polymeric tubing having an inflatable flotation device on a distal end thereof, and inflating the flotation device to suspend a distal end of the lightweight polymeric tubing in the mine cavity.

13. A method for disposing of biomass waste, comprising, locating an abandoned coal mine having a first abandoned well drilled into or through a mine cavity of the abandoned coal mine having a roof and a floor level;
   removing acidic water from the mine cavity of the abandoned coal mine through a second well drilled into or through the abandoned coal mine, wherein the second well is optionally an abandoned well;
   combining the acidic water from the mine cavity with a biomass waste comprising at least 60 wt. % carbon to provide biomass waste entrained in the acidic water;
   pumping the biomass waste entrained in the acidic water through the first abandoned well into the mine cavity to fill the mine cavity with the biomass waste; and
   as the biomass waste settles in the mine cavity, recirculating the acidic water used to entrain the biomass to combine with additional biomass waste.

14. The method of claim 13, further comprising plugging at least the first abandoned well below the floor level of the abandoned coal mine.

15. The method of claim 13, further comprising using a directional deviation tool in the first abandoned well to open one or more additional windows in the first well casing and first well casing cement to fill the mine cavity surrounding the first abandoned well with the biomass waste and repositioning the directional deviation tool in the first abandoned well to open one or more additional windows in the first well casing and first well casing to fill the mine cavity surrounding the first abandoned well with the biomass waste.

16. The method of claim 15, wherein the directional deviation tool comprises a whipstock.

17. The method of claim 13, further comprising using a directional deviation tool in the first abandoned well to open a first window in a first well casing, first well casing cement, and a coal pillar adjacent to the first abandoned well into the mine cavity and repositioning the directional deviation tool in the first abandoned well to open one or more additional windows in the first well casing, first well casing cement, and coal pillar adjacent to the first abandoned well to fill the mine cavity surrounding the first abandoned well with the biomass waste.

18. The method of claim 13, wherein the step of pumping biomass entrained in the acidic water through the first abandoned well into the mine cavity further comprises pumping the biomass waste entrained in the acidic water through a flexible tubing into the abandoned coal mine.

19. The method of claim 18, wherein the flexible tubing comprises a swivel nozzle at a distal end of the flexible tubing to broadcast the biomass waste into the mine cavity.

20. The method of claim 13, wherein the step of pumping biomass waste entrained in acidic water through the first abandoned well into the mine cavity further comprising:
   pumping the biomass waste entrained in the acidic water through a lightweight polymeric tubing having an inflatable flotation device on a distal end thereof;
   inflating the flotation device to suspend a distal end of the lightweight polymeric tubing in the mine cavity; and
   extending the flexible tubing to a distance of at least about 30 meters into the mine cavity and withdrawing the flexible tubing through the first abandoned well as the mine cavity fills with biomass waste.

\* \* \* \* \*